United States Patent [19]
Corriveau

[11] Patent Number: 5,722,122
[45] Date of Patent: Mar. 3, 1998

[54] PINTLEPIN

[75] Inventor: André Corriveau, Rock Forest, Canada

[73] Assignee: Lippert Pintlepin Mfg Inc., Rock Forest, Canada

[21] Appl. No.: 677,968

[22] Filed: Jul. 10, 1996

[51] Int. Cl.$^6$ ............................................ E05D 5/10
[52] U.S. Cl. ............................................ 16/386; 16/109
[58] Field of Search ............................ 16/386, 108, 109; 198/844.2; 474/255; 24/33 P; 162/904

[56] References Cited

U.S. PATENT DOCUMENTS

| | | | |
|---|---|---|---|
| 631,427 | 8/1899 | Lantz | 16/109 |
| 1,863,061 | 6/1932 | Larsen | 16/109 |
| 2,962,782 | 12/1960 | Beach | 16/386 |

*Primary Examiner*—Chuck Mah
*Assistant Examiner*—Mark Williams
*Attorney, Agent, or Firm*—Robic

[57] ABSTRACT

A pintlepin is disclosed, for use to connect together adjacent ends of segments of an endless belt. The pintlepin has a pintle consisting of at least one filament having an outer diameter substantially identical to the diameter of the tubular opening formed by the intermeshed loops used as a seam at the adjacent ends of the segments to be connected. It also has a leader made of a rigid or semi-rigid material. This leader has an outer diameter smaller than the outer diameter of the tubular opening. It acts as a guide to facilitate insertion for the pintle through the tubular opening formed by the loops. A swager connects together the pintle and the leader. This swager consists of a tubing having a front portion and a rear portion in which the rear end of the lader and the front end of the pintle are respectively swaged. The front end of the pintle has a peripheral recess sized and shaped to receive the rear portion of the swager and thus prevent this swager from having an outer diameter exceeding the outer diameter of the pintle. This feature renders the insertion of the pintlepin much easier to carry out. The front portion of the swager also has a front edge which is forwardly downwardly bevelled. This feature reduces the risk of damaging the loops.

16 Claims, 2 Drawing Sheets

PINTLEPIN

BACKGROUND OF THE INVENTION a) Field of the Invention

The present invention relates to improvements to the structure of seam connectors hereinafter called "pintlepins", which are used for connecting together adjacent ends of segments of an endless belt.

b) Brief Description of the Prior Art

In some industries, especially the papermaking industry, use is made of machines comprising endless belts. Such belts which are sometimes called "felts", usually consist of segments of fabric whose ends are joined by a fabric or metal seam. Each seam is made of loops that are integral to the ends of the adjacent segments and positioned in such a manner as to intermesh and form together a substantially tubular opening extending over the full width of the belt. To close the seam, a lacing cable or yarn, called "pintle" in the trade, is inserted through the so-formed tubular opening.

To facilitate insertion (viz. threading) of the pintle through the tubular opening when, for example, a worn or torn-out segment must be replaced by another one for maintenance purpose, it is of common practice to attach a rigid or semi-rigid guide wire, called "lead-in wire" or "leader" in the trade, to the front end of the pintle. Such leader is connected to the pintle by means of a metal sleeve or tubing, hereinafter called "swager", in which the adjacent ends of the leader and pintle are swaged. The resulting assembly including the pintle, the leader and the swager, is called "pintlepin" by some manufacturers, including the Applicant. For the sake of simplicity, this expression will be used hereinafter to designate this assembly.

In use, the leader is inserted into one end of the tubular opening and pushed through the seam until it reaches the opposite end of the opening which, depending on the width of the belt, may be up to 12 meters long. Then, the tip of the leader may be grasped and pulled until the pintle is in position.

From a practical standpoint, it is of the uppermost importance that the outer diameter of the pintle used for closing the seam be substantially equal to the diameter of the tubular opening formed by the intermeshed loops. Indeed, such permits to avoid slacks in the belt and to reduce the risk of premature tearing out of the seam. Thus, it is of common practise to use a pintle sized to snugly fit into the corresponding tubular opening.

It is also of common practice to use a leader of smaller diameter that the pintle to which it is connected, in order to facilitate insertion of the leader into the intermeshed loops which are not necessarily well in line when the leader is inserted into one end of the seam and pushed forwards.

It is further of common practise to use a leader having a mark on its forward portion adjacent to its tip, in order to make this portion immediately visible if, by accident, one of the intermeshing loops is not engaged during installation of the pintlepin. Such a mark may consist of a layer of paint of bright or fluorescent colour that is applied onto the forward portion of the leader to make it clearly visible if is moves out of the seam.

If all the above features are highly desirable and actually requested by the pintlepin users, some of them have some inherent drawbacks that have not be overcome so far.

A first one of these drawbacks is directly "associated" to the above mentioned requirement that the outer diameter of the pintle be equal to the diameter of the tubular opening defining the seam. When such a requirement is met, the swager which, as aforesaid, consists of a tubing pinched or swaged onto the front end of the pintle, necessarily has at least its rear portion that is of a larger diameter than the front end of the pintle and thus of a greater diameter then the tubular opening. As a result, the pintlepin is very difficult to insert and push and may even be jammed if one may not reach its tip to pull it.

A second drawback lies in the way the front edge of the swager is shaped. If, as has been done so far, this front edge is straight and thus extends in a radial plane relative to the leader on which it is swaged, it forms a "step" which reduces the above mentioned advantage deriving from the use of a leader of smaller diameter. Such step may also "scratch" and damage the loops under certain circumstances.

A third drawback lies in the way the paint has been applied so far onto the forward portion of the leader to make it visible. As aforesaid, such a leader is made of rigid or semi-rigid material, which is preferably a metal such as stainless steel, an alltemper rod or a spring-wire. The paint is applied as a coating onto the leader and does not really "stick" on it. As a result, it is often scratched out by friction as soon as the leader is moved forwards in the seam, thereby making its tip no more visible.

SUMMARY OF THE INVENTION

A first object of the present invention is to provide an improved pintlepin of the above mentioned type, which, thanks to its structure, does not have any more the first drawback mentioned hereinabove. In other words, the first object of the invention is to provide an improved pintlepin which is easy to install in a seam having a tubular opening of the very same diameter as the pintle of the pintlepin.

A second object of the invention is to provide an improved pintlepin which, in addition to the above improvement, does not have any more the second drawback above herein mentioned. More particularly, the second object of the invention is to provide an improved pintlepin whose swager does not form a step that scratches the loops of the seam during its insertion.

A third object of the invention is to provide an improved pintlepin whose visible mark is "applied" in a much better way onto the forward portion of the leader, thereby making such mark more difficult not to say impossible to scratch out.

The pintlepin according to the invention is intended to be used for connecting together adjacent ends of segments of an endless belt of a given width, the adjacent ends having loops that are positioned in such a manner as to intermesh and form together a tubular opening of a given diameter extending over the full width of the belt.

Like all the existing pintlepins like the one disclosed, by way of example, in Canadian patent No. 1,329,021 of 1994 to ASTEN GROUP INC., the pintlepin according to the invention comprises:

a pintle consisting of at least one unshielded filament, the pintle having a front end and an outer diameter substantially identical to the diameter of the tubular opening formed by the intermeshed loops at the adjacent ends of the segments to be connected;

a leader made of a rigid or semi-rigid material, the leader being of a smaller diameter than the diameter of the tubular opening and having a front end, hereinafter called "tip", and a rear end, the leader acting as a guide to facilitate insertion for the pintle through the tubular opening in order to form together with the loops, a segment-connecting seam; and a swager for connecting together the pintle and the leader. the swager consisting of a tubing having a front portion and a rear portion in which the rear end of the leader and the front end of the pintle are respectively swaged in coaxial and adjacent relationship.

In accordance with the first object of the invention as reported hereinabove, the pintlepin disclosed hereinabove is improved in that the front end of the pintle has a peripheral recess sized and shaped to receive the rear portion of the swager and thus prevent this swager from having an outer diameter exceeding the outer diameter of the pintle. As a result, the swager does not exceed in size the pintle and thus does not make its insertion into the seam more difficult.

In accordance with the second object of the invention, the pintlepin disclosed hereinabove may also be improved in that the front portion of its swager in which the leader is swaged, has a front edge which is forwardly downwardly bevelled. As a result, there is no more "step" onto the leader, which may damage the loops.

In accordance with the third object of the invention, the pintlepin according to the invention may further be improved in that the forward portion of the leader on which the paint is applied to, has a grated surface. Such a grated surface can be made by grinding, sanding or swedging, and causes the paint to adhere to the leader in a much better way than before.

The invention and its numerous advantages will be better understood upon reading the following non-restrictive description of a preferred embodiment thereof given with reference to the accompanying drawing.

BRIEF DESCRIPTION OF THE DRAWINGS

For simplicity's sake, the same reference numerals have been used to identify the same structural elements in the accompanying drawings.

GENERAL DESCRIPTION OF THE INVENTION

Figure 1:
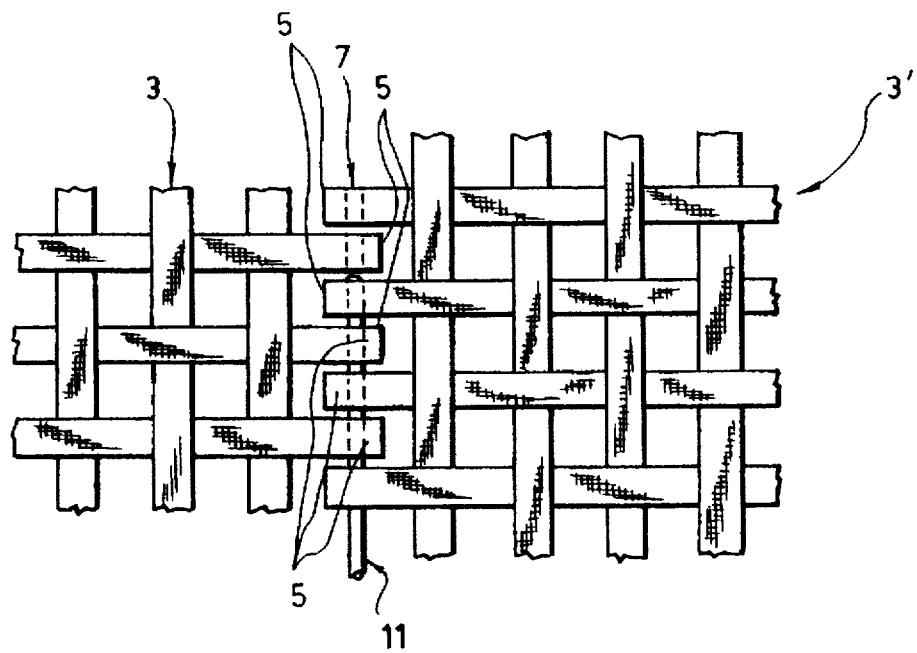
FIG. 1 is a schematic plan view of the seam of two adjacent fabric segments of an endless belt, showing the way such a seam is closed with a pintle.
Figure 2:
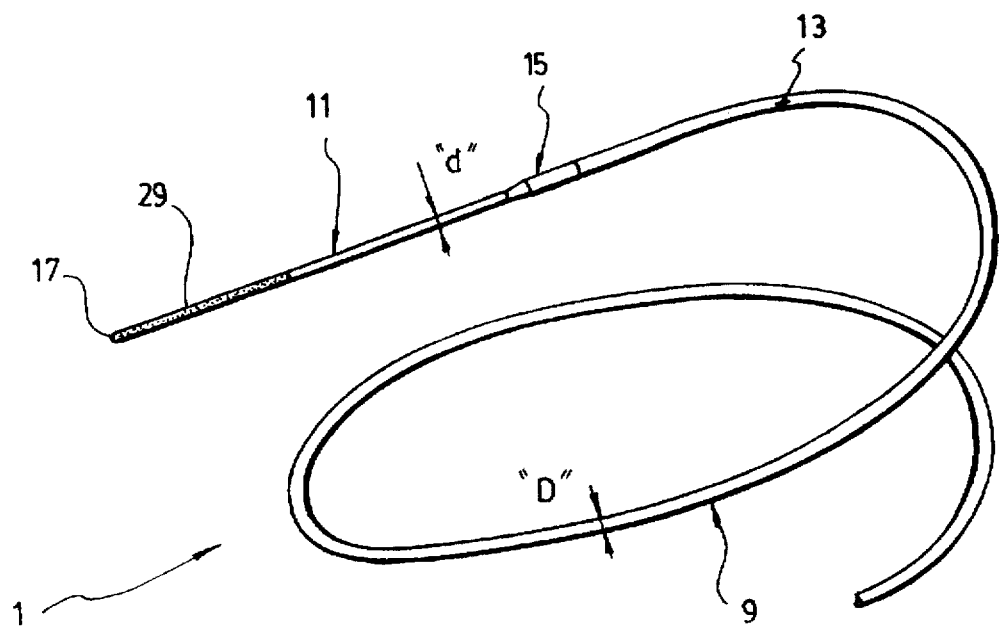
FIG. 2 is a perspective view of a pintlepin of conventional structure.

As it has already been explained hereinabove in the "Background of the invention", the present invention is concerned with improvements to the structure of the pintlepins 1 (see FIG. 2) that are used for connecting together the adjacent ends of segments of fabric 3,3' (see FIG. 1) in order to form an endless belt. Each of the adjacent ends includes loops 5 which are positioned in such a manner as to intermesh and form together a tubular opening 7 extending over the full width of the belt. The intermeshed loops 5 defines a seam closed by means of a pintle 9 which consists of one or more filaments preferably made of a synthetic material such as Nylon or polyester.

In the following description, reference is made exclusively to a pintle consisting of a monofilament, such being the most preferred embodiment of the invention because of the simplicity of its manufacture. However, it must be understood that the invention is not restricted to this embodiment and could easily be adapted to pintles consisting of more than one filaments, as is disclosed in the above mentioned Canadian patent No. 1,329,021, or with pintles made of strands of synthetic fibers braided together, as is disclosed in Canadian patent No. 944,183 of 1974 to FILZ-TUCHVERWALTUNGSGESELLSCHAFT.

To facilitate insertion of the pintle 9 though the tubular opening 7 defining the seam, a rigid or semi-rigid guide wire 13 called "leader" is connected to the front end 14 of the pintle 9 by means of a metal tubing 15 called "swager". The leader 13 has a tip 17 which is preferably rounded to facilitate its insertion. It is preferably made of metal, such as stainless steel, and is of such a length as to make it easy to push through the tubular opening until its tip 17 can be grasped and pulled.

As aforesaid, the swager 15 which connects together the pintle 9 and the leader 13, is made of a metal which is preferably stainless steel, brass or copper. It has a rear portion 19 in which the front end 14 of the pintle is swaged. It also has a rear portion 21 in which the rear end 23 of the leader is swaged.

The leader 13, swager 15 and pintle 9 altogether forms the pintlepin 1 referred to hereinabove, which is sold as such to those who have to connect end-to-end segments of a fabric endless belt. As can be understood, after completion of the connection, the leader 13 and any excess of the pintle 13 must be cut out.

In practice, the pintle 9 is selected in such a manner that its outer diameter "D" is substantially identical to the diameter of the tubular opening 7 formed by the intermeshed loops 5 at the ends of the adjacent segments 3, 3' to be connected. Such is important to avoid slacks in the belt and to reduce the risk of premature tearing out of the seam. The leader 13 is also selected in such a manner that its outer diameter "d" be smaller than "D", in order to facilitate its insertion into the intermeshed loops 5.

Figure 3:
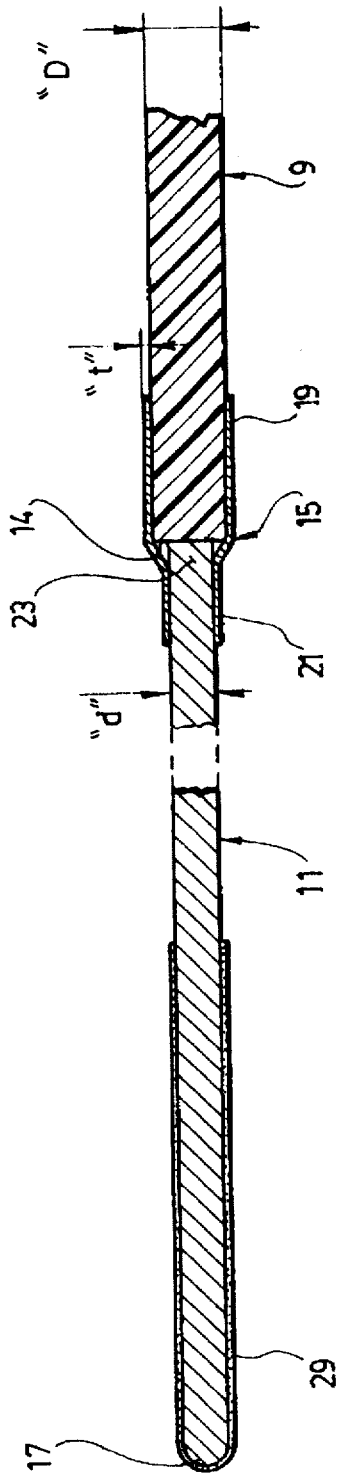
FIG. 3 is identified as "prior art", is a partial view of a pintlepin of known structure, wherein the tip of the leader and the swager are shown in cross-section.

In the existing pintlepins, like the one shown in FIG. 3, the swedger 15 always has a rear portion 19 which is of a larger diameter than the front end 14 of the pintle 9. As was explained hereinabove, this can be a problem when the pintle 9 is of the same diameter as the tubular opening 7, because the outer diameter of the pintle 9 is "increased" by the thickness "t" of the metal sheet forming the swedger.

In accordance with the invention, this problem is very simply yet efficiently solved by making a peripheral recess 25 all around the front end 14 of the pintle 9. Such recess 25 can be made by cutting, scraping or molding the front end 14 of the pintle 9. It is sized and shaped to receive the rear portion 19 of the swager 15 and thus to prevent it from having an outer diameter that exceeds the outer diameter of the pintle which itself corresponds to the inner diameter of the tubular opening 7.

Figure 4:
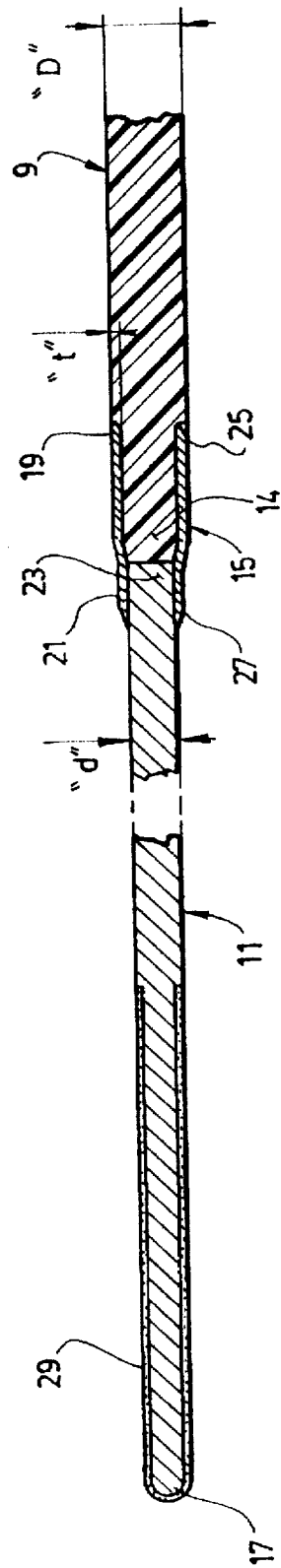
FIG. 4 is a view similar to the one of FIG. 3, showing the tip of the leader and the swager of a pintlepin according to the invention.

Preferably, the depth of the recess 25 is selected so as to be substantially equal to the thickness "t" of the metal sheet forming the swager, so that the outer surface of the swager 15 extends flat with the one of the pintle 9, as is shown in FIG. 4.

It has been found out by the Applicant that this "solution" solves very efficiently the above problem, without affecting the strength of the connection between the swedger 15 and the pintle 9.

In accordance with a preferred embodiment of the invention, another problem noticed with the existing pintlepins is solved by using a swager 15 having a front edge 27 which is forwardly downwardly bevelled, as is shown in FIG. 4. As a result, there is no more step onto the rearward portion leader, which may damage the loops 5.

As aforesaid, it is of common practice to apply a layer or coating 29 of paint of bright or fluorescent colour onto the forward portion of the leader 13, adjacent to its tip, in order to "mark" this portion and make it clearly visible if, by accident, one of the loops 5 of the seam is not engaged.

In accordance with another preferred embodiment of the invention, such a coating of paint 29 is applied onto the leader 13 after the forward portion of the same has been grated by sanding, grinding or swedging. Such a grating causes the paint to adhere to the leader in a much better way and not to exceed the outer diameter of the remaining portion of the same. This solves a further problem encountered with the existing pintlepins like the one shown in FIG. 3.

Of course, numerous other modifications could be made to the preferred embodiment of the invention broadly disclosed hereinabove without departing from the scope of the invention as defined in the appended claims.

What is claimed is:

1. In a pintlepin for use to connect together adjacent ends of segments of an endless belt of a given width, said adjacent ends having lops that are positioned in such a manner as to intermesh and form together a tubular opening of a given diameter extending over the full width of the belt, said pintlepin comprising:

a pintle consisting of at least one unshielded filament, said pintle having a front end and an outer diameter substantially identical to the diameter of the tubular opening formed by the intermeshed loops at the adjacent tends of the segments to be connected;

a leader made of a rigid or semi-rigid material, said leader having an outer diameter smaller than the outer diameter of the tubular opening and having a front end, defining a tip, and a rear end, said leader acting as a guide to facilitate insertion for the pintle through the tubular opening; and a swager for connecting together the pintle and the lader, said swager consisting of a tubing having a front portion and a rear portion in which the rear end of the leader and the front end of the pintle are respectively swaged in coaxial and adjacent relationship;

the improvement wherein:

the front end of the unshielded pintle has a peripheral recess made therein; and said peripheral recess is sized and shaped to allow the front end of the pintle to be flush with the rear portion of the swager and thus prevent said swager from having an outer diameter exceeding the outer diameter of the pintle.

2. The improved pintlepin of claim 1, wherein the front portion of the swedger in which the leader is swaged, has a front edge which is forwardly downwardly bevelled.

3. The improved pintlepin of claim 2, wherein the recess in the front end of the pintle has been made by scraping.

4. The improved pintlepin of claim 2, wherein the recess in the front end of the pintle has been made by cutting.

5. The improved pintlepin of claim 2, wherein the recess in the front end of the pintle has been made by molding.

6. The improved pintlepin of claim 2, wherein the tip of the leader is rounded.

7. The improved pintlepin of claim 2, wherein the leader has a forward portion adjacent its tip, which is provided with a visible mark.

8. The improved pintlepin of claim 7, wherein the visible mark consists of a layer of paint applied onto the forward portion of the leader.

9. The improved pintlepin of claim 8, wherein the forward portion of the leader on which the paint is applied to, has a grated surface.

10. The improved pintlepin of claim 9, wherein the grated surface is made by grinding.

11. The improved pintlepin of claim 9, wherein the grated surface is made by sanding.

12. The improved pintlepin of claim 9, wherein the grated surface is made by swedging.

13. The improved pintlepin of claim 2, wherein:

the tip of the leader is rounded; and the leader has a forward portion adjacent its tip, which has a grated surface and on which a layer of a paint is applied to as a visible mark.

14. The improved pintlepin of claim 13, wherein:

the pintle consists of only one of said at least one filament;

said one filament is made of a synthetic material;

the swager is made of a metal selected from the group consisting of stainless steel, brass and copper; and the leader is made of stainless steel.

15. The improved pintlepin of claim 14, wherein the swager is made of a metal sheet of a given thickness and the recess in the front end of the pintle has a depth subsequently equal to said thickness.

16. The improved pintlepin of claim 1, wherein the swager is made of a metal sheet of a given thickness and the recess in the front end of the pintle has a depth subsequently equal to said thickness.

* * * * *